United States Patent
Beunings

(10) Patent No.: US 7,428,597 B2
(45) Date of Patent: Sep. 23, 2008

(54) CONTENT-BASED ROUTING SYSTEM AND METHOD

(75) Inventor: Frank Beunings, Wiesloch (DE)

(73) Assignee: SAP AG, Walldorf (DE)

( * ) Notice: Subject to any disclaimer, the term of this patent is extended or adjusted under 35 U.S.C. 154(b) by 491 days.

(21) Appl. No.: 10/402,862

(22) Filed: Mar. 27, 2003

(65) Prior Publication Data
US 2003/0217176 A1 Nov. 20, 2003

Related U.S. Application Data

(60) Provisional application No. 60/368,839, filed on Mar. 28, 2002.

(51) Int. Cl.
G06F 15/16 (2006.01)
G06F 15/173 (2006.01)
G06F 3/00 (2006.01)
G06F 9/44 (2006.01)
G06F 9/46 (2006.01)
G06F 13/00 (2006.01)
G06Q 10/00 (2006.01)
G06Q 30/00 (2006.01)

(52) U.S. Cl. .................... 709/238; 709/227; 709/230; 709/236; 709/237; 709/244; 719/313; 719/315; 719/328

(58) Field of Classification Search .......... 709/238–244
See application file for complete search history.

(56) References Cited

U.S. PATENT DOCUMENTS

| 6,021,443 A * | 2/2000 | Bracho et al. ............... 709/241 |
| 6,256,676 B1 * | 7/2001 | Taylor et al. ................ 709/246 |
| 6,538,996 B1 * | 3/2003 | West et al. .................. 370/238 |
| 6,779,184 B1 * | 8/2004 | Puri et al. .................... 719/315 |
| 2003/0041178 A1 * | 2/2003 | Brouk et al. ................ 709/238 |
| 2005/0021838 A1 * | 1/2005 | Levett ........................ 709/238 |

* cited by examiner

Primary Examiner—John Follansbee
Assistant Examiner—Hassan Phillips
(74) Attorney, Agent, or Firm—Mintz, Levin, Cohn, Ferris, Glovsky & Popeo, P.C.

(57) ABSTRACT

Systems and methods for routing messages between applications in a network are disclosed. Messages are routed from a sending application to one or more receiving applications according to one or more routing rules. Each routing rule is used for determining the one or more receiving applications, and is associated with at least one routing object. The routing object is configured to associate the routing rule to the message based on content of the message. The routing objects are stored in a repository of design-time descriptions of the applications. The routing rules are stored in a directory of runtime descriptions of applications in the runtime landscape, and are accessed by a runtime engine for executing the routing.

13 Claims, 5 Drawing Sheets

CONTENT-BASED ROUTING SYSTEM AND METHOD

CROSS REFERENCE TO RELATED APPLICATIONS

This application claims priority to U.S. Provisional Patent Application No. 60/368,839, filed on Mar. 28, 2002.

TECHNICAL FIELD

The description below relates generally to computer communications, and more particularly to methods and systems for routing messages from sending applications to receiving applications.

BACKGROUND

In a collaborative software environment, in which networked software components share information, it is undesirable and inefficient to have a message-sending application always specify receivers of message data. In order to properly specify every receiver for each sending application, an administrator would need to know each receiver, configure it to receive messages, and specify it at least in a logical context in an outgoing message. For many applications, it is not important to know what receivers are present, but rather these applications simply broadcast messages to a network at large.

To require a sending application to specify all receivers, the application would have to be configured with a receiver determination logic. Further it is a waste of resources to read all data from the database to build up a message, only to find that no receiver is interested in the message.

SUMMARY

This document discloses routing model systems and techniques. A routing model enables the administrator of a complex system landscape to define the message flow between systems from a business perspective. Without knowing the technical details of the system landscape, the administrator can specify that a sending system uses a specific outbound interface to call a specific inbound interface in a receiving system under certain conditions, i.e. the sender and receiver are logical systems like business systems or business partners, rather than technical systems.

In one aspect, a method of transmitting a message from a sending application to one or more receiving applications in a network is providing. The method includes the steps of receiving a message from the sending application, and routing the message to one or more receiving applications according to one or more routing rules for determining the one or more receiving applications. Each routing rule is associated with a routing object, and the routing object is configured to associate the routing rule to the message based on content of the message.

In another aspect, a method of determining receivers of a message from a sending application is provided in which it may be determined whether there are any receivers of a message prior to constructing, or assembling, the entire message by the sending application. The method includes storing a plurality of routing rules in a directory, where the routing rules include one or more routing objects for determining a receiver of the message. The method further includes the steps of providing an application programming interface (API) to the directory and determining, via the API and prior to construction of the message by the sending application, whether there are any receivers specified for the message.

A system for routing messages between applications in a network includes a repository storing design-time descriptions of routing criteria for the applications, a directory storing configuration-specific descriptions of routing criteria for a runtime network landscape, and a runtime engine configured to access information from the directory to route messages between the applications. The repository stores a plurality of routing objects, and each routing object is configured to determine one or more receiving applications of a message based on message content. The directory stores one or more routing rules, where each routing rule is associated with one or more routing objects. The runtime engine accesses the routing rules to route messages according thereto.

BRIEF DESCRIPTION OF THE DRAWINGS

These and other aspects will now be described in detail with reference to the following drawings.

DETAILED DESCRIPTION

The systems and techniques described here relate to a message exchange protocol for reliably communicating data between applications in a heterogeneous system landscape. The protocol is optimally implemented in an exchange infrastructure configured to integrate and drive collaboration between various applications in the landscape using open standards and transport protocols such as HTTP.

Figure 1:
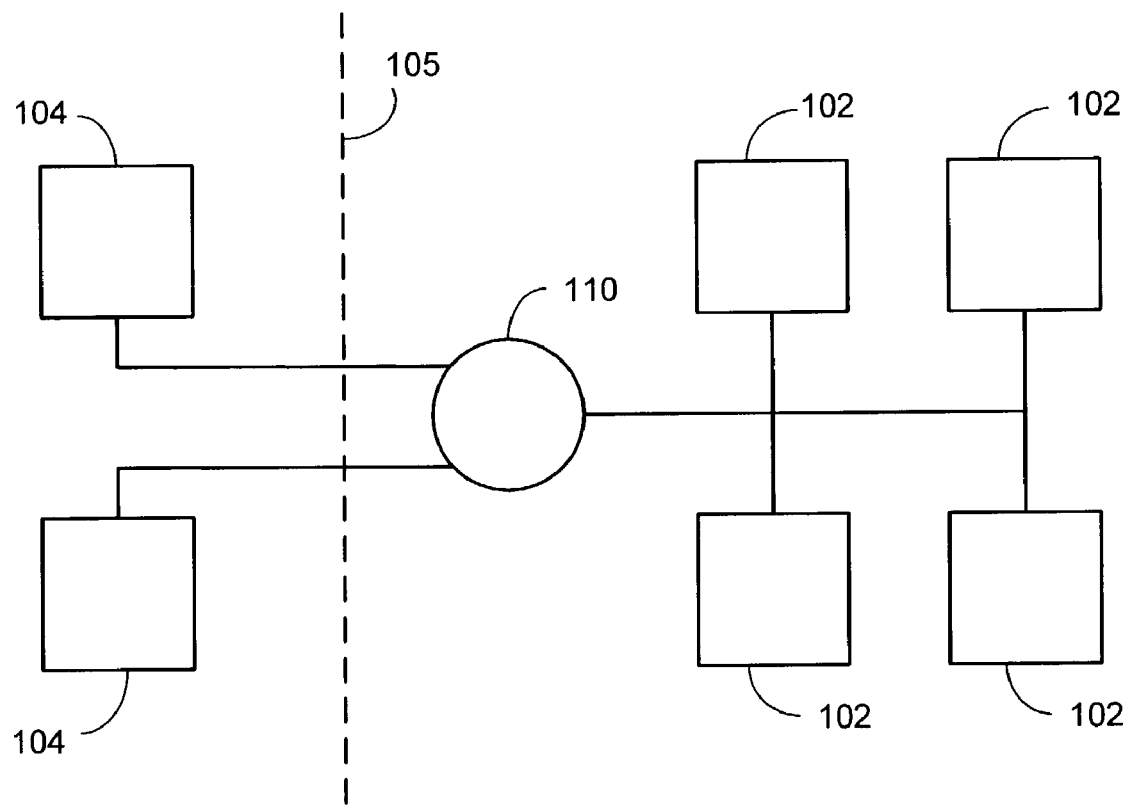
FIG. 1 is a simplified block diagram of an exchange system for integrated, message-based collaboration.

FIG. 1 is a simplified block diagram of a system 100 for integration and "loose coupling" (i.e. message-based interaction) of applications. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components 102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
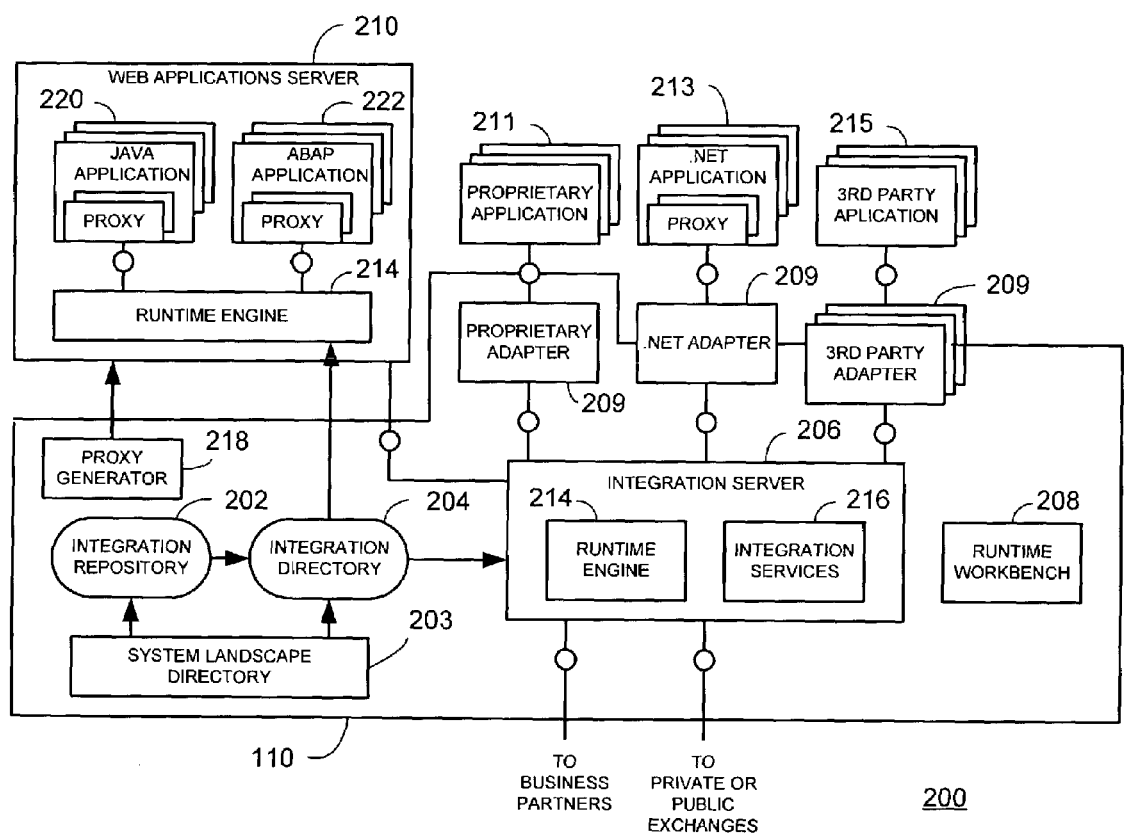
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 also includes integration services 216 that typically require an application-specific implementation. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web applications server 210 that provides Web-based applications programmed according to standard computing platforms using web-specific programming languages such as Java and ABAP, for instance. The Web applications server 210 also includes an instance of the runtime engine 214 for providing messaging and business process control between Web-based applications such as Java applications 220 and ABAP applications 222, and other components.

New interfaces for software components can be defined using an application component employing a proxy, which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented based on the proxy that represents the interface description of the respective development platform, such as Java, ABAP, and .NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated, as implemented by the receiving application.

Figure 3:
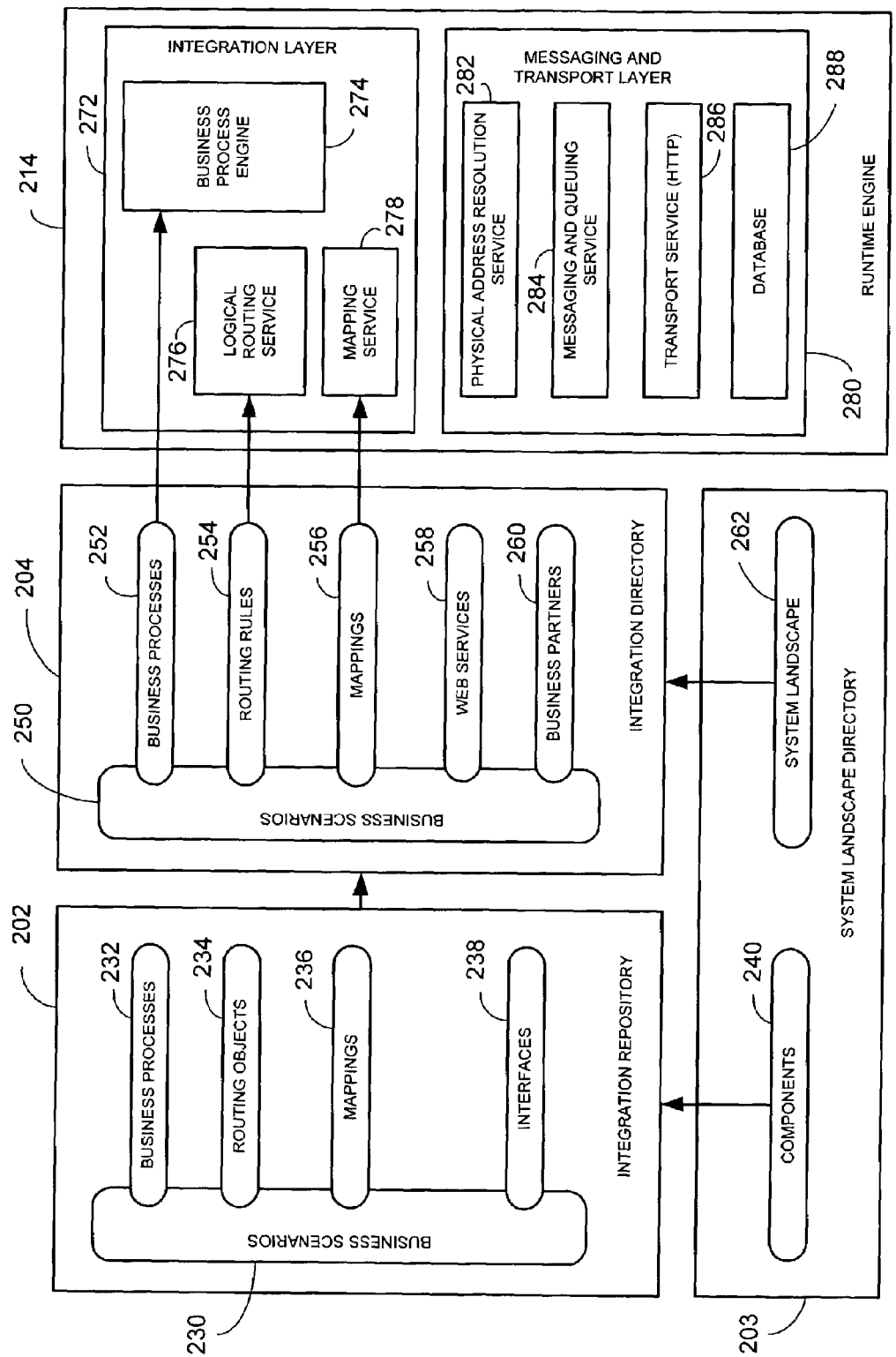
FIG. 3 is a detailed block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are pointers that point to a specific part of a message. They are predefined criteria to determine potential receivers of messages that must be distributed between components and business partners during collaborative processing. Information about the routing objects is used for receiver determination. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, only component-type information, independent of actual installation, is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java or use routing objects 234. The integration engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 262 defines information for business partners of an enterprise, such as names, addresses, and URLs, but may also contain more detailed and sophisticated information. For instance, the business partners 262 may include a description of the message formats that can be directly received and processed, or of security protocols used for safe communications, or trading terms that are employed in the partnership. The kind of information stored in business partners 262 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes the collaborative runtime environment or Web application server 210, either of which can include an instance of the runtime engine 214 in accordance with informational resources provided by the integration directory 204.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
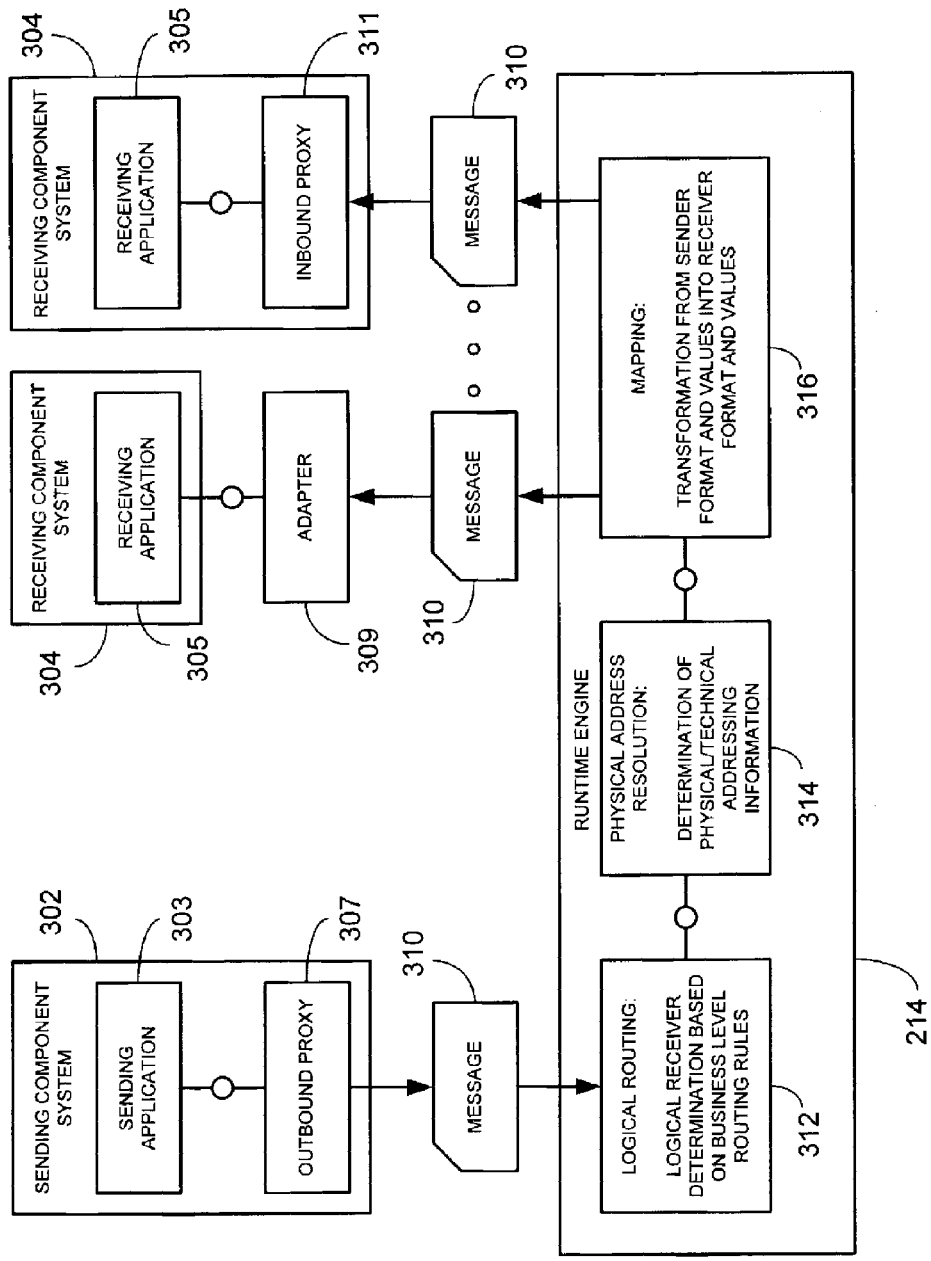
FIG. 4 is a block diagram illustrating a process for communicating a single message between two applications.
Figure 5:
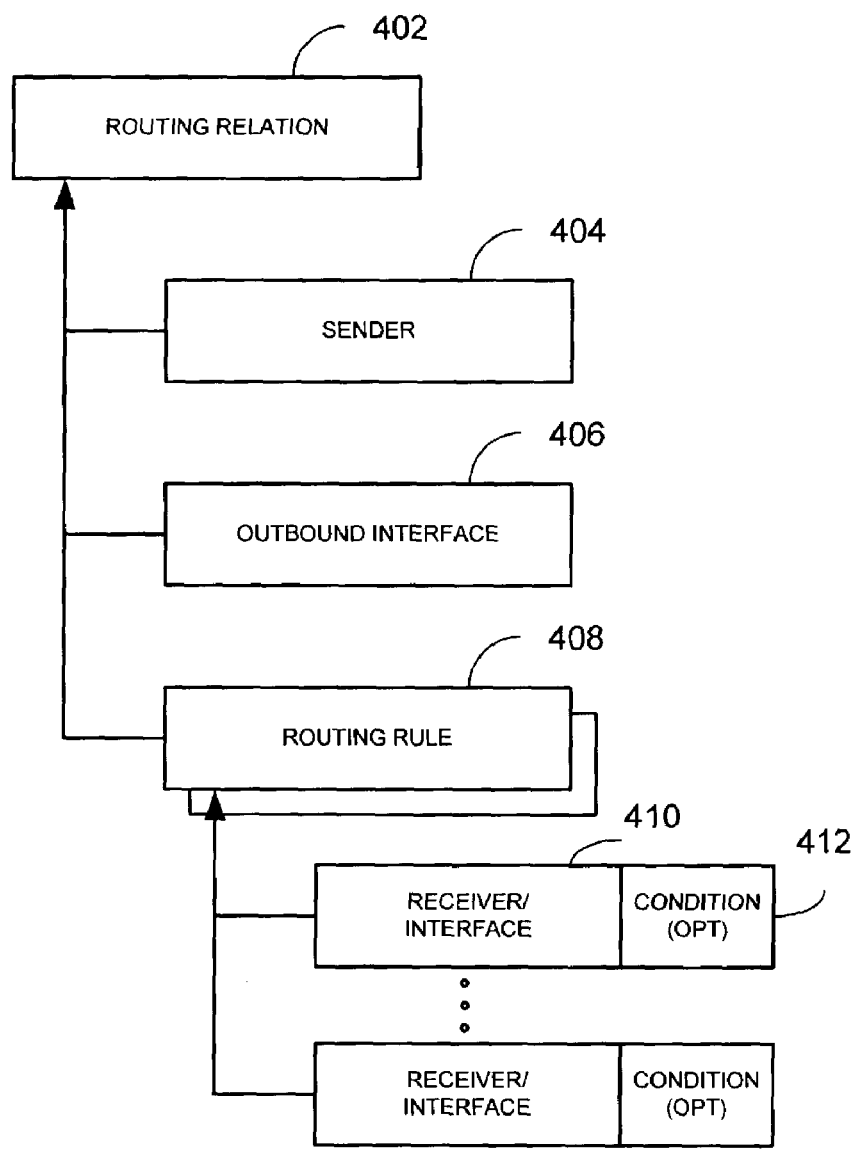
FIG. 5 illustrates a routing relation and its content.

FIG. 4 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender, which is already known.

With reference also to FIGS. 2 and 3, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as Xpath expressions or Java code. The mapping service 278 determines the required transformations that depend on message, sender, and sender interface, as well as the receiver and receiver interface, at 314. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer, messaging, queuing, and transport services 284 move the message to the intended or required receiver(s). After the message is transformed into the format expected by each receiver, the physical address of the required receiver service and other relevant attributes are retrieved from the integration directory 204 and mapped to the message, at 316.

A queuing engine in the messaging and queuing service 284 stores ingoing, outgoing, erroneous, and work-in-progress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both an HTTP client and server. The transport service 286 implements an HTTP client that enables outbound communication and an HTTP server that handles inbound communication by accepting incoming documents. Additional server functions can address situations in which the receiver has no HTTP server by supporting polling over HTTP.

A routing model defines the message flow regarding one or more business processes. It is a way of grouping messages, and is valid during a certain period of time. A routing relation defines a communication channel (i.e. sender, outbound interface, receiver, inbound interface) while the routing rule includes a test as to whether this channel will be used for a given message. A routing rule can be defined as a logical expression using routing objects. Alternatively, in specific implementations a routing rule is an Xpath expression scanning the message body, or JAVA coding receiving the message body and returning a Boolean.

The routing model is used to determine the receivers and the inbound interfaces for a given message being sent. A service called "logical routing" take places on one or more runtime engines 214, such as the integration engine or collaborative runtime environment. To improve performance, a routing model directory can be cached at runtime and distributed to all clients where logical routing will take place via remote access to the runtime engine. The routing model provides APIs to determine the receivers of a given outbound interface call before the data has been completely collected by the sending application. This enables the sending application to find out whether a message needs to be sent at all, prior to expending resources collecting the data.

According to a preferred implementation, there are two different target groups that use the routing model: application developers who design outbound interfaces, define routing object, and specify where to find the values for routing objects in their interface; and administrators who define the messaging between systems within their company, as well as messages exchanged with business partners.

In an implementation, there are three different groups of use cases: 1) development of the integration repository 202; 2) configuration of the routing model; and 3) receiver determination at runtime (logical routing). In the first use case, the tasks of a system administrator is greatly simplified by identifying relevant routing objects 234 and specifying where to find them in their interfaces 238. For the next group of use cases, configuration of the routing model, administrators can configure a business process 232 that spans more than one system or product by defining the messages that are to be exchanged. An administrator can create a new routing model to group all messages relevant for a particular business process 232 and add routing relations for each message to be sent. The administrator can also create rules and assign them to the routing relations.

In a third group of use cases, the integration server 206 can use the routing model to determine the logical receivers of a given message. The integration server 206 passes the message including a specific header to the logical routing service 276 in the runtime engine 214. The runtime engine 214 checks the routing relations and their routing rules in all valid routing models for receivers, and adds the valid receivers to the message header.

FIG. 3 illustrates the arrangement and functionality of a routing relation 402. The routing 402 is made up of a sending application description 404, an outbound interface description 406 for the sending application, and one or more routing rules 408. Each routing rule 408 is expressed as a routing object, Java coding, or Xpath expression, and includes a receiving application description 410, which can include an interface description for the receiving application, and an optional condition description 412. The condition description 412 can specify a condition for routing an object to a particular receiving application defined by the receiving application description 410.

A routing relation 402 provides a communication channel between two systems: the messages created by a sender's outbound interface can be delivered to a receiver's inbound interface. Whether a given message instance is really distributed according to a routing relation 402 depends on the message body, i.e. the application data within the message, and will be determined by the associated routing rule(s) 408. It is possible to have more than one routing relation 402 with the same sender and outbound interface so that a message might be sent to several receivers. The sender and receiver can be specified according to any business scenario 250 or business process 252 from the integration directory 204. However, the routing relation 402 can also be defined using raw strings or raw interfaces.

Routing objects can be defined by the sending application to cover the most common criteria for receiver determination. Preferably, a GUI can be used to define routing rules 408 with routing objects, so instead of having to know a rather complex language such as Xpath or JAVA, a user can simply choose the appropriate routing objects. The GUI can be implemented as a thick client connected to the configuration server using RMI. The GUI enables the user to work either inside the company's LAN or behind a firewall. The GUI also enables an administrator to define the message flow between internal systems, as well as the message flow between internal systems and external components. Moreover, the GUI will enable the administrator to gain an overview of the message flow in an optimized presentation, such as messages sent or received by one system, messages regarding one business process, or an overview of the complete message flow.

To accomplish receiver determination, all information about routing relations 402 needs to be cached in all systems where logical routing will take place. Since the routing relation 402 will support a system landscape with more than one runtime engine, there must be consistency between cached directories, such that no matter which client uses the runtime APIs, the same set of receivers and interfaces will be returned for any message. Since all integration directories 204 cache the necessary information at runtime, a common concept can be employed to guarantee consistency between them.

Referring back to FIG. 3, the integration repository 202 includes routing objects 234 and routing object value extractors. Business partners such as customers can define their own routing objects 234, and relate them to any outbound interface 238 according to any business scenario 230. Routing objects 234 belong to a software component and can be defined by an application by a name, a description, and a global business entity or, if no global business entity is available, a simple data type.

Each routing object 234 can be used in more than one outbound interface 238, and so for each interface 238, it must be determined where to find the routing object's 234 value in corresponding XML messages. This information, called the routing object value extractor (ROVE), can be defined for the interface at design-time. The ROVE can relate a given outbound interface 238 to any routing object 234 with the same global business entity or simple data type, from the same or another software component. The runtime engine 214 operates on a persistent storage to execute the routing relations and routing rules 254, including used routing objects 234 and their corresponding ROVEs. The local storage should be kept consistent so that the same receivers can be determined on any runtime system.

When a message is passed to the routing model runtime by the integration server 206/runtime engine 214, it contains a message body that includes application data, and a message header. The message header includes data used by the runtime engine 214 for logical routing, mapping, and physical routing. The sender and its outbound interface, as well as the receivers and their inbound interfaces, are parts of the header. The sender and outbound interface fields may already contain values, otherwise the receiver determination will exit with an exception.

The message header may take the form of at least one of the following scenarios: 1) no receiver specified; 2) exactly one receiver specified and the receiver is the runtime system; or 3) one or more receivers specified and none are the runtime system. The first case, where no receiver is specified, will likely be the most common situation. The routing model runtime will calculate the receivers and their inbound interfaces according to all valid routing relations, and write them into the message header. The second case where only the runtime system is specified occurs if the message has been sent by another integration server. The routing model runtime will calculate the receivers and their inbound interfaces according to all valid routing models, and will then replace the supplied receiver with the newfound receivers and their interfaces.

In the third case, where one or more receivers are specified and none of them are the runtime system, occurs if the receiver determination already took place, such as on the sending system in the integration engine or by the sending application itself for instance. The runtime engine will not perform receiver determination, but will simply accept the message receivers. However, in this case it could still happen that only the receiving systems are specified but not inbound interfaces for those receiving systems. In this situation, the routing model runtime will check the valid routing models and add the inbound interfaces for the specified receivers. If a routing relation cannot be found for a given receiver, the receiver determination will end with an exception. Another case, in which more than one receiver is specified, one of which is the runtime system, should not occur and is not supported by the routing model runtime. In the event this situation occurs, the receiver determination will end with an exception.

Some applications provide outbound interfaces with a large number of parameters. These applications typically support a "publish and subscribe" function where copies of certain objects will be distributed to all interested systems. To avoid having to build a message for which no receiving system is interested, the integration directory offers API's to determine the receivers of a message before its data has been collected completely, according to the following process:

First, the application determines whether there is an interested receiving system at all (i.e. a routing relation with the local system as a sender of the application's outbound interface) and, if so, whether the rules for these relations are built on routing objects. Second, and optionally, if there are systems interested in the application's messages, the application can read the values of all routing objects supported by the outbound interface and ask the routing model directory for the receivers of a message containing these values. This second step should only be relevant for applications with large interfaces. The values of the routing objects are passed to the API directly instead of being extracted from the message body by an XML parser. The routing objects can also be defined by third parties, and the applications should contain an exit to read those values.

Although a few embodiments have been described in detail above, other modifications are possible. Other embodiments may be within the scope of the following claims.

The invention claimed is:

1. A computer-implemented method comprising:
   receiving, at an exchange infrastructure server and via an application programming interface (API) call, a request for a determination of client receiving applications of a message from a client sending application, the request received prior to the client sending application assembling the message;
   determining whether there are any client receiving applications for the message, the determining comprising:
   evaluating routing relations having pairs of client sending applications and their associated outbound interfaces paired with client receiving applications and their associated inbound interfaces to determine if any relationships expressed in routing relations exist between the outbound interface of the client sending application and a client receiving application; and determining that no client receiving applications exist if no client receiving application has a routing relation with the outbound interface of the client sending application; and sending a response to the API call, to the client sending application, indicating whether any client receiving application for the message exists, the response to be used by the client sending application to terminate assembly of the message if no client receiving applications for the message exist and otherwise continue assembly of the message if a client receiving application for the message exists.

2. The method of claim 1, wherein outbound and inbound interfaces are from a plurality of message interfaces defining structures of data of messages, the outbound interfaces for the structure of the message from client sending applications, and the inbound interfaces for client receiving applications to receive the message.

3. The method of claim 1 further comprising:

the client sending application terminating assembly of the message if the response indicates no client receiving applications exist.

4. The method of claim 1, wherein the exchange infrastructure server includes a business process engine for routing messages based at least in part on at least one business process accessed from the directory.

5. The method of claim 1, wherein a directory at the exchange infrastructure server is configured for storing one or more mappings, and wherein each mapping describes predefined mappings from a client sending application to one or more client receiving applications in a runtime network landscape.

6. The method of claim 1, wherein the exchange infrastructure server includes a mapping service for routing messages based at least in part on at least one mapping accessed from a directory including predefined mappings from a client sending application to one or more client receiving applications in a runtime network landscape.

7. A computer-implemented method comprising:

receiving, at an exchange infrastructure server and via an application programming interface (API) call, a request for a determination of client receiving applications of a message from a client sending application, the request received prior to the client sending application assembling the message and the request comprising values for routing objects if any routing objects are to correspond to the message; and determining whether there are any client receiving applications for the message, the determining comprising:

evaluating routing relations having pairs of client sending applications and their associated outbound interfaces paired with client receiving applications and their associated inbound interfaces to determine if any relationships expressed in routing relations exist between the outbound interface of the client sending application and client receiving applications;

if a client receiving application has a relationship expressed by a routing relation with the outbound interface of the client sending application, determining whether a routing rule associated with the routing relation is defined by routing objects, routing objects defining criteria of a routing rule, the exchange infrastructure server storing two types of rules comprising a first type of rules defined by routing objects and a second type of rule not defined by routing objects where the second type relies on a scan of content of a message body to determine whether conditions of a rule are met, and if a routing rule associated with the routing relation is defined by routing objects, querying a repository of routing objects at the exchange infrastructure server to determine if a client receiving application of the routing relation satisfies conditions of routing objects based on the values for routing objects sent with the API call; and determining that no client receiving applications exist if no client receiving application has a routing relation with the outbound interface of the client sending application or if a routing rule that is defined by routing objects resolves to no client receiving application satisfying corresponding conditions;

sending a response to the API call indicating whether any client receiving applications for the message exist, the response to be used by the client sending application to terminate assembly of the message if no client receiving applications for the message exist, and the message to include an indication of a client receiving application if a client receiving application exists and a routing relation had a corresponding routing rule defined by routing objects;

receiving, at the exchange infrastructure server, the message assembled by the client receiving application if any client receiving applications for the message exist, the message comprising indications of one or more client receiving applications to receive the message; and evaluating rules associated with the outbound interface of the client sending application if the message is based on an outbound interface for which rules not defined by routing objects exist, the evaluating rules to determine receiving client applications for the message.

8. A computer program product, embodied on a computer-readable storage media, the computer program product to cause a data processing apparatus to perform operations comprising:

receiving, at an exchange infrastructure server and via an application programming interface (API) call, a request for a determination of client receiving applications of a message from a client sending application, the request received prior to the client sending application assembling the message;

determining whether there are any client receiving applications for the message, the determining comprising:

evaluating routing relations having pairs of client sending applications and their associated outbound interfaces paired with client receiving applications and their associated inbound interfaces to determine if any relationships expressed in routing relations exist between the outbound interface of the client sending application and a client receiving application; and determining that no client receiving applications exist if no client receiving application has a routing relation with the outbound interface of the client sending application; and sending a response to the API call, to the client sending application, indicating whether any client receiving application for the message exists, the response to be used by the client sending application to terminate assembly of the message if no client receiving applications for the message exist and otherwise continue assembly of the message if a client receiving application for the message exists.

9. The computer program product of claim 8, wherein outbound and inbound interfaces are from a plurality of message interfaces defining structures of data of messages, the outbound interfaces for the structure of the message from client sending applications, and the inbound interfaces for client receiving applications to receive the message.

10. The computer program product of claim 8 further comprising:

the client sending application terminating assembly of the message if the response indicates no client receiving applications exist.

11. The computer program product of claim 8, wherein the exchange infrastructure server includes a business process engine for routing messages based at least in part on at least one business process accessed from the directory.

12. The computer program product of claim 8, wherein a directory at the exchange infrastructure server is configured for storing one or more mappings, and wherein each mapping describes predefined mappings from a client sending application to one or more client receiving applications in a runtime network landscape.

13. The computer program product of claim 8, wherein the exchange infrastructure server includes a mapping service for routing messages based at least in part on at least one mapping accessed from a directory including predefined mappings from a client sending application to one or more client receiving applications in a runtime network landscape.

* * * * *